US008411136B2

(12) United States Patent
Ito

(10) Patent No.: US 8,411,136 B2
(45) Date of Patent: Apr. 2, 2013

(54) VIDEO DISPLAY APPARATUS AND VIDEO DISPLAY METHOD

(75) Inventor: Ken Ito, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 44 days.

(21) Appl. No.: 12/878,961

(22) Filed: Sep. 9, 2010

(65) Prior Publication Data

US 2011/0175978 A1 Jul. 21, 2011

(30) Foreign Application Priority Data

Jan. 21, 2010 (JP) .................................. 2010-011429

(51) Int. Cl.
*H04N 13/04* (2006.01)
*G02F 1/13357* (2006.01)
*G02F 1/1335* (2006.01)

(52) U.S. Cl. .......... 348/51; 348/761; 348/766; 348/790; 349/15

(58) Field of Classification Search ............... 348/51, 348/761, 766, 790; 349/15
See application file for complete search history.

(56) References Cited

U.S. PATENT DOCUMENTS

| | | | |
|---|---|---|---|
| 7,477,331 B2* | 1/2009 | Lin et al. ......................... | 349/15 |
| 2004/0109155 A1* | 6/2004 | Deines ........................... | 356/28.5 |
| 2005/0134762 A1* | 6/2005 | Sung et al. ..................... | 349/96 |
| 2006/0139448 A1* | 6/2006 | Ha et al. ......................... | 348/51 |
| 2008/0007661 A1* | 1/2008 | Soh ................................ | 348/790 |
| 2008/0291152 A1* | 11/2008 | Nakao et al. ................... | 345/102 |
| 2011/0205344 A1* | 8/2011 | Lee ................................. | 348/56 |

FOREIGN PATENT DOCUMENTS

| | | |
|---|---|---|
| JP | 9-51552 | 5/1979 |
| JP | 8-505014 | 5/1996 |
| JP | 2003-202519 | 7/2003 |
| JP | 2005-157033 | 6/2005 |
| JP | 2006-157775 | 6/2006 |
| JP | 2006-184447 | 7/2006 |
| JP | 2007-163701 | 6/2007 |
| JP | 2007-163706 | 6/2007 |
| JP | 2008-287180 | 11/2008 |
| JP | 2009-217142 | 9/2009 |
| JP | 2010-49049 | 3/2010 |
| JP | 2010-61105 | 3/2010 |

OTHER PUBLICATIONS

Machine translation of JP H09-051552 A.*
Machine translation of JP 2007-163701 A.*
Japanese Application No. JP-2010-011429 Office Action dated May 10, 2011.

* cited by examiner

*Primary Examiner* — Nhon Diep
*Assistant Examiner* — David N Werner
(74) *Attorney, Agent, or Firm* — Patterson & Sheridan, LLP

(57) ABSTRACT

In general, according to one embodiment, a video display apparatus includes a backlight, a signal processing module, a transmission-type display panel, and a lighting timing generation processing module. The signal processing module is configured to process an input video signal and output an output video signal for 2D display or 3D display. The transmission-type display panel is configured to control transmission of light supplied from the backlight according to the output video signal. The lighting timing generation processing module is configured to switch between a backlight lighting period for the 2D display and a backlight lighting period for the 3D display in such a manner that a time of a center of gravity of a figure formed by a response level-time curve in the backlight lighting period is later in the 3D display than in the 2D display.

7 Claims, 9 Drawing Sheets

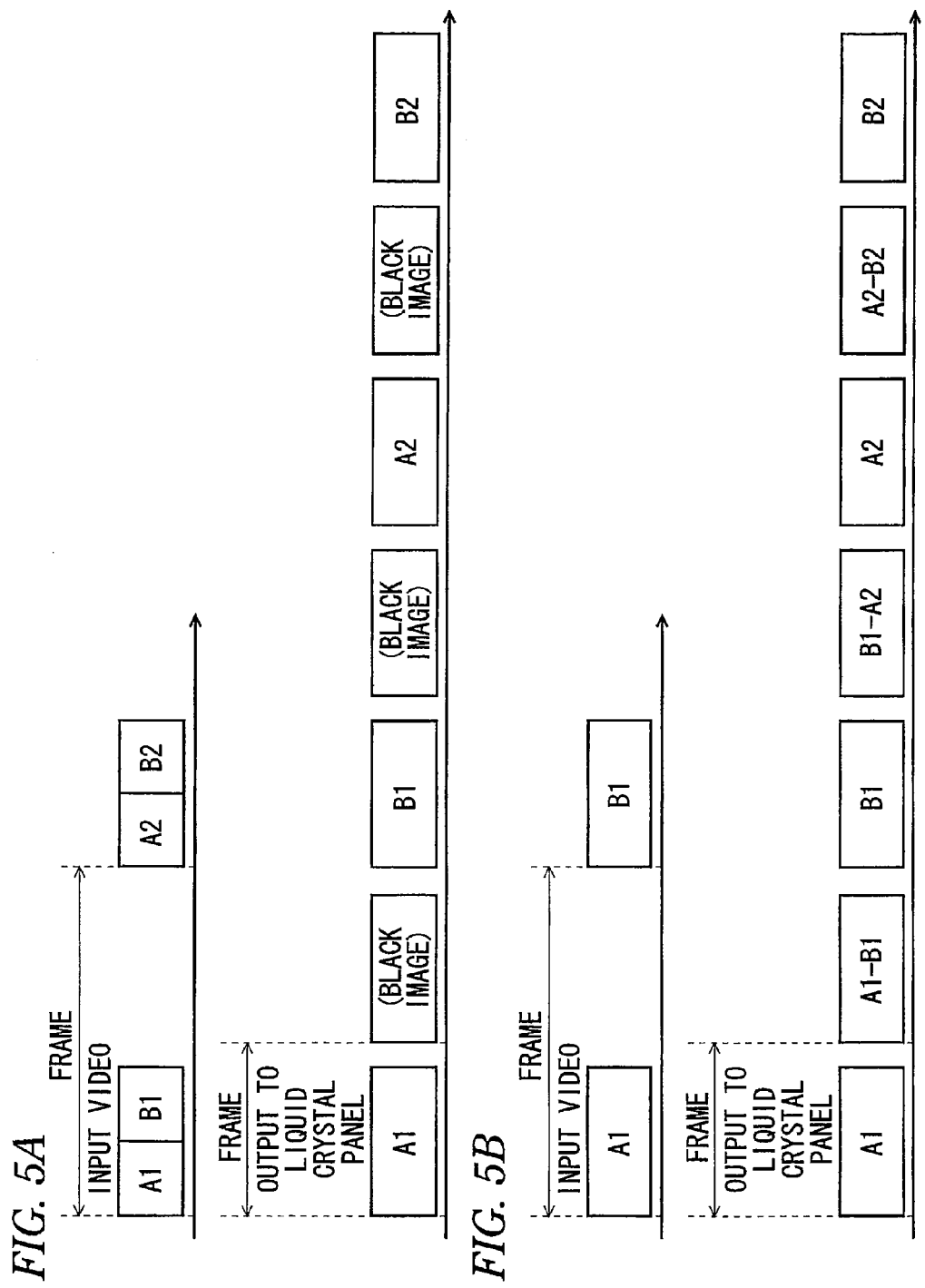

VIDEO DISPLAY APPARATUS AND VIDEO DISPLAY METHOD

CROSS REFERENCE TO RELATED APPLICATION(S)

This application is based upon and claims the benefit of priority from Japanese Patent Application No. 2010-011429 filed on Jan. 21, 2010, entire contents of which are incorporated herein by reference.

BACKGROUND

1. Field

Embodiments described herein relate generally to a video display apparatus and a video display method.

2. Description of the Related Art

In liquid crystal TV receivers, a moving image is blurred because of low response speed of the liquid crystal. One common countermeasure is to turn on the backlight with such timing that a response of the liquid crystal has completed and target video has been rendered well displayable. However, whereas 3D display has come to be employed in recent years, no satisfactory methods have been developed which vary the backlight turn-on timing when switching is made between the 2D display and the 3D display of a display panel.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

FIGS. 5A and 5B are exemplary diagrams showing video signals for 3D display and 2D display, respectively, used in the first embodiment;

DETAILED DESCRIPTION

In general, according to one embodiment, a video display apparatus includes a backlight, a signal processing module, a transmission-type display panel, and a lighting timing generation processing module. The signal processing module is configured to process an input video signal and output an output video signal for 2D display or 3D display. The transmission-type display panel is configured to control transmission of light supplied from the backlight according to the output video signal. The lighting timing generation processing module is configured to switch between a backlight lighting period for the 2D display and a backlight lighting period for the 3D display in such a manner that a time of a center of gravity of a figure formed by a response level-time curve in the backlight lighting period is later in the 3D display than in the 2D display.

Exemplary embodiments will be described below.
(Embodiment 1)
A first embodiment will be described below with reference to FIG. 1 to FIG. 7B.

Figure 1:
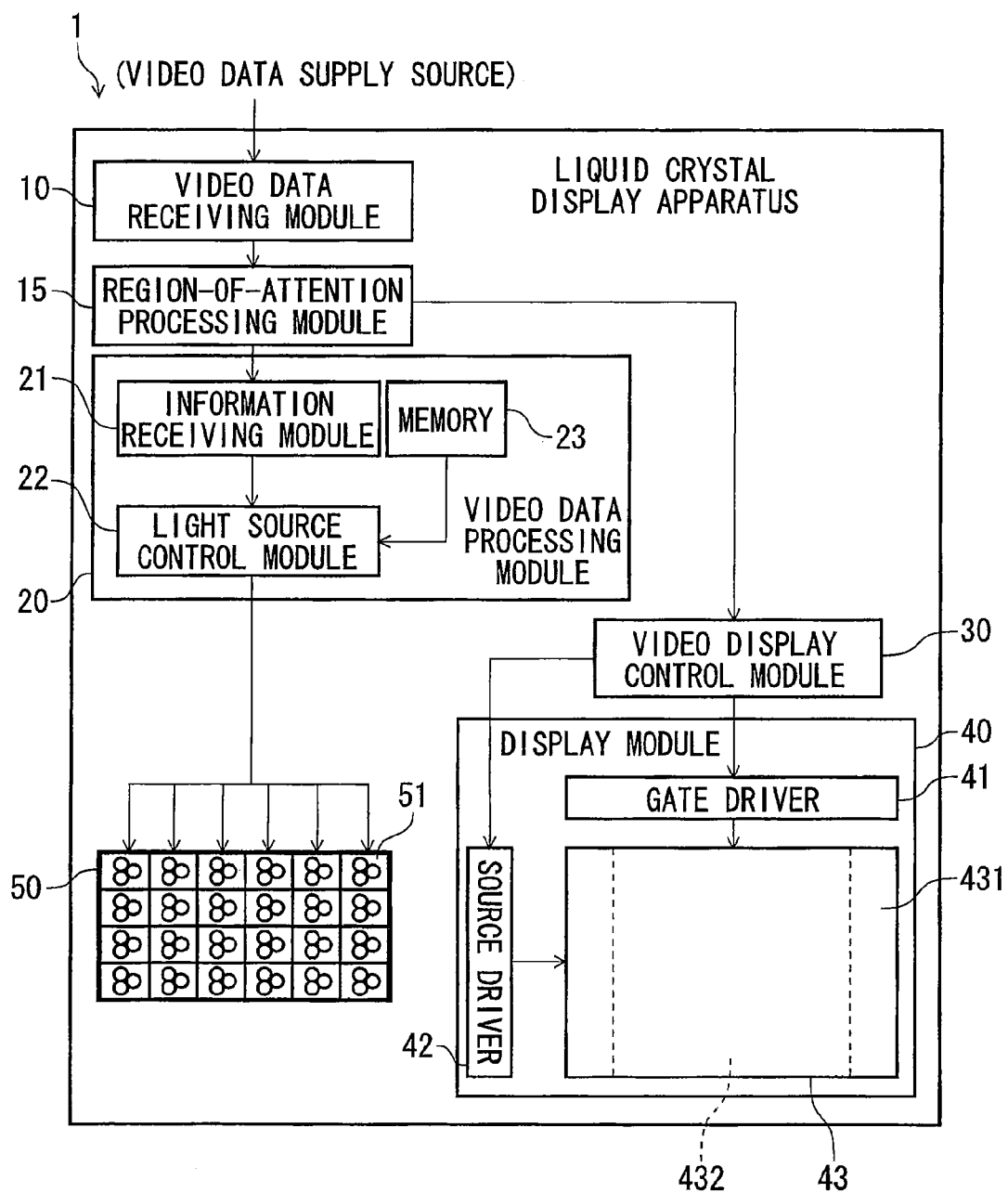
FIG. 1 is an exemplary block diagram showing a configuration of a liquid crystal display apparatus according to a first embodiment.

FIG. 1 is an exemplary block diagram showing the configuration of a liquid crystal display apparatus 1 according to the first embodiment. As shown in FIG. 1, the liquid crystal display apparatus 1 includes a video data receiving module 10, a region-of-attention processing module 15, a video data processing module 20, a video display control module 30, a display module 40, and a backlight 50 as a light source.

Connected to an outdoor antenna (not shown), for example, the video data receiving module 10 receives video data via the antenna. The video data receiving module 10 can receive various kinds of video data that are carried by terrestrial analog waves, terrestrial digital waves, satellite broadcast waves, etc. The video data receiving module 10 can also be connected to any of various video playback apparatus (e.g., HD DVD player, HD DVD recorder, DVD player, and DVD recorder). When connected to such a video playback apparatus, the video data receiving module 10 receives video data that is played back by the video playback apparatus.

The video data receiving module 10 outputs the received video data to the video data processing module 20 and the video display control module 30 via the region-of-attention processing module 15. Video data that is received by the video data receiving module 10 has one of various specific aspect ratios such as 4:3 and 16:9. The aspect ratio is the ratio of the horizontal width to the vertical width of video data.

Video data has video aspect ratio information indicating its aspect ratio.

The video display control module 30 receives the video data from the video data receiving module 10 and causes the display module 40 to display video.

The display module 40 includes a liquid crystal panel 43, a gate driver 41 and a source driver 42.

The liquid crystal panel 43 has an aspect ratio 16:9. For example, video data having an aspect ratio 16:9 is displayed in a display area 431 having an aspect ratio 16:9, that is, the entire display area, of the liquid crystal panel 43. Video data having an aspect ratio 4:3 is displayed in a central display area 432 (indicated by broken lines) having an aspect ratio 4:3.

Although not shown in any drawing, the liquid crystal panel 43 is configured in such a manner that a liquid crystal is sandwiched between two glass plates and scanning lines and data lines are arranged in lattice form on the glass plates. The scanning lines and the data lines are controlled being driven by the gate driver 41 and the source driver 42, respectively, which are provided along end lines of the liquid crystal panel 43. The gate driver 41 has a function of outputting pulse voltages to the scanning lines sequentially.

The source driver 42 supplies voltages to the liquid crystal as the gate driver 41 outputs the pulse voltages. The liquid crystal 43 displays video as such voltages are applied to the liquid crystal through the driving by the gate driver 41 and the source driver 42.

The video data processing module 20 includes an information receiving module 21, a light source control module 22, and a memory 23. For processing shown in FIG. 4 (described later), the region-of-attention processing module 15 includes, for example, a CPU, a ROM for storing programs, a RAM to serve as a work area, etc. (none of which are shown). The information receiving module 21 receives the video data that is output from the video data receiving module 10. The information receiving module 21 receives the video aspect ratio information that is contained in the received video data, and outputs the received video aspect ratio information to the light source control module 22.

The memory 23 is stored with backlight turn-on/off table data to be referred to by the light source control module 22 in controlling light source units 51. The backlight turn-on/off table data is information to be used for turning on/off the light source units 51 which constitute a backlight 50. Different sets of backlight turn-on/off table data are provided for respective aspect ratios of video data.

The light source control module 22 reads backlight turn-on/off table data from the memory 23. The light source control module 22 controls the turn-on/off of the light source units 51 which constitute the backlight 50 based on backlight turn-on/off table data corresponding to the video aspect ratio information that is output from the information receiving module 21. As such, the light source control module 22 functions as a lighting control module.

The backlight 50 (i.e., light source units 51) supplies light to the display area 431 or 432 of the display module 40. As such, the backlight 50 functions as a light source.

The backlight 50 is provided on the back side of the liquid crystal panel 43. Although not shown in any drawing, a pair of diffusion plates and a prism sheet (sandwiched between the pair of diffusion plates) are disposed between the backlight 50 and the liquid crystal panel 43. The pair of diffusion plates serve to scatter and diffuse light that is supplied from the light source units 51 and thereby causes the entire display area to have uniform brightness.

The prism sheet is to increase the luminance of light that is supplied from the backlight 50.

Each light source unit 51 includes multiple LEDs (light emitting diodes) that emit light beams of the three primary colors, that is, red (hereinafter abbreviated as R), green (hereinafter abbreviated as G), and blue (hereinafter abbreviated as B). Each light source unit 51 can emit white light by mixing light beams that are emitted from the R, G, and B LEDs.

No limitations are imposed on how each light source unit 51 is configured by LEDs. For example, each light source unit 51 may be a set of one R LED, two G LEDs, and one B LED or a set of two R LEDs, three G LEDs, and one B LED.

The number of colors of LEDs constituting each light source unit 51 is not limited to three; each light source unit 51 may be formed by any of various combinations of LEDs such as LEDs of four or more colors or a white LED.

Furthermore, the light source element that is used for forming each light source unit 51 is not limited to the LED and may be any of various kinds of light-emitting elements. For example, the light-emitting element may be the organic EL (electroluminescence) device, inorganic EL device, laser diode (LD), or the like.

Figure 2A:
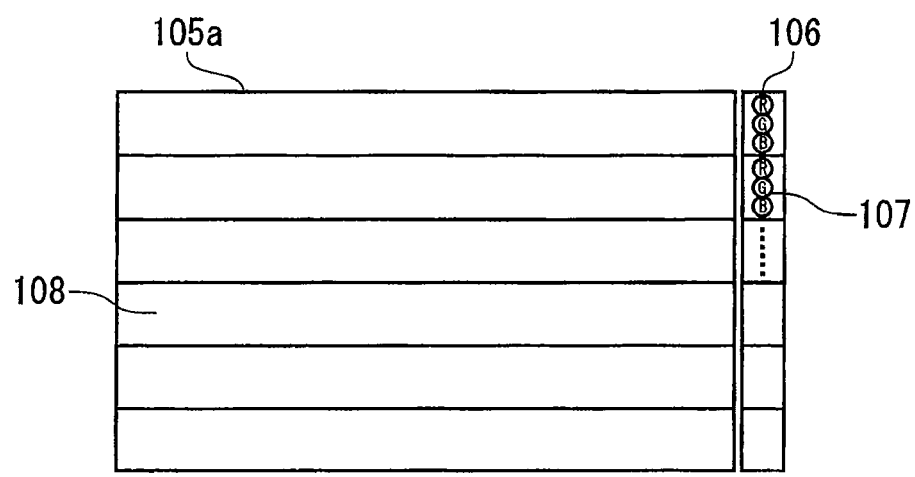
FIGS. 2A and 2B are exemplary diagrams showing modified examples of a backlight in the liquid crystal display apparatus according to the first embodiment.
Figure 2B:
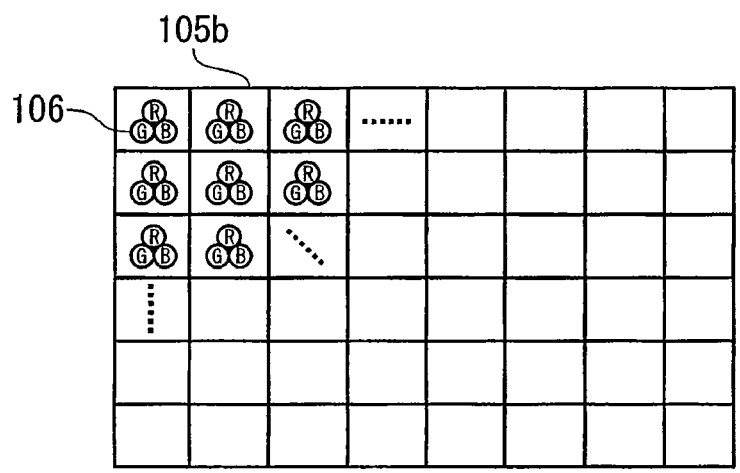

Next, examples of the backlight 50 that can be subjected to a scan control will be described. FIGS. 2A and 2B show backlights 105a and 105b which are modified examples of the backlight 50 shown in FIG. 1.

First, the backlight 105a shown in FIG. 2A will be described which is an edge-type backlight using light guide plates 108. The backlight 105a is divided into multiple (in this example, six) parts by the light guide plates. However, the division number is not limited to any particular numbers and may be a desired number. In this example, the backlight 105a includes a backlight lighting module which can control independently the lighting of six division parts arranged in the vertical direction (perpendicular to the line direction (video signal scanning direction)). Six light source units 106 are provided for the light guide plates 108 at their edges, respectively, and each light source unit 106 is provided with R, G, and B light source elements 107. The light source elements 107 are LEDs, EL devices, LDs, or the like. As described above, each light source unit 106 is not limited to a set of R, G, and B light source elements and may be a white light source such as a quasi-white one. Furthermore, a light source having a flat light-emitting surface may be used without light guide plates 108.

Next, the backlight 105b shown in FIG. 2B will be described which is a bottom-emitting-type backlight and is of the same type as the backlight 50 shown in FIG. 1. The backlight 105b includes light source units 106 (correspond to the light source units 51 shown in FIG. 1) having R, G, and B light source elements. The light source units 106 are arranged in a 6×8 matrix (×: multiplication symbol). Naturally, the division number is not limited to any particular numbers and may be a desired number. The division number may be 8×11, and 8×8 division and 8×16 division, for example, are in practical use now. With this arrangement, a control can be performed for each region extending in the line direction. Naturally, the backlight 105b can also be controlled according to an area control. Also in this example, each light source unit 106 consisting of R, G, and B light source elements is not limited to a set of LEDs and may be a set of EL devices, LDs, or the like. Naturally, each light source unit 106 is not limited to a set of R, G, and B light source elements and may be a white light source such as a quasi-white one.

Figure 3:
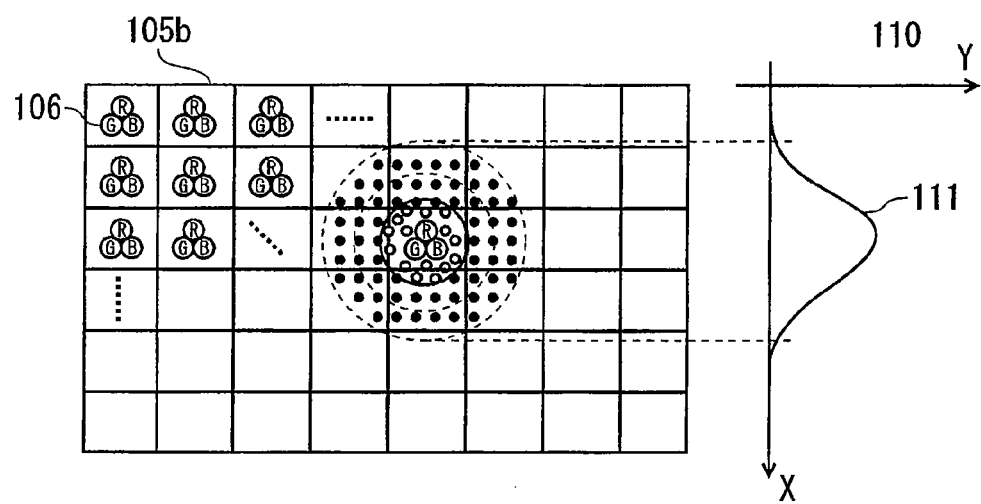
FIG. 3 is an exemplary diagram showing a backlight control method of the backlight in the first embodiment.

Next, a backlight control method will be described in the case of using the backlight 105b which is divided into the light source units 106 which are arranged in matrix form. FIG. 3 is an exemplary diagram in which attention is paid to one light source unit 106 of the backlight 105b. Now, assume that only one light source unit 106 of attention is turned on. Light that is emitted from this light source unit 106 reaches the liquid crystal panel 43 in such a state as to cover a region that is wider than the original divisional region because of its own diffusion and the diffusion by optical films such as diffusion plates. A graph 110 is shown on the right of the part showing the structure of the backlight 105b in FIG. 3. A simplified profile 111 indicating a light expanse is shown in the graph 110, in which the X axis represents the distance and the Y axis represents the relative luminance. The profile 111, which can be approximated by a Gaussian distribution or a distribution represented by another exponential function is drawn schematically in the graph 110. The graph 110 is just intended for help in understanding the description and hence is not associated with any numerical values.

Figure 4:
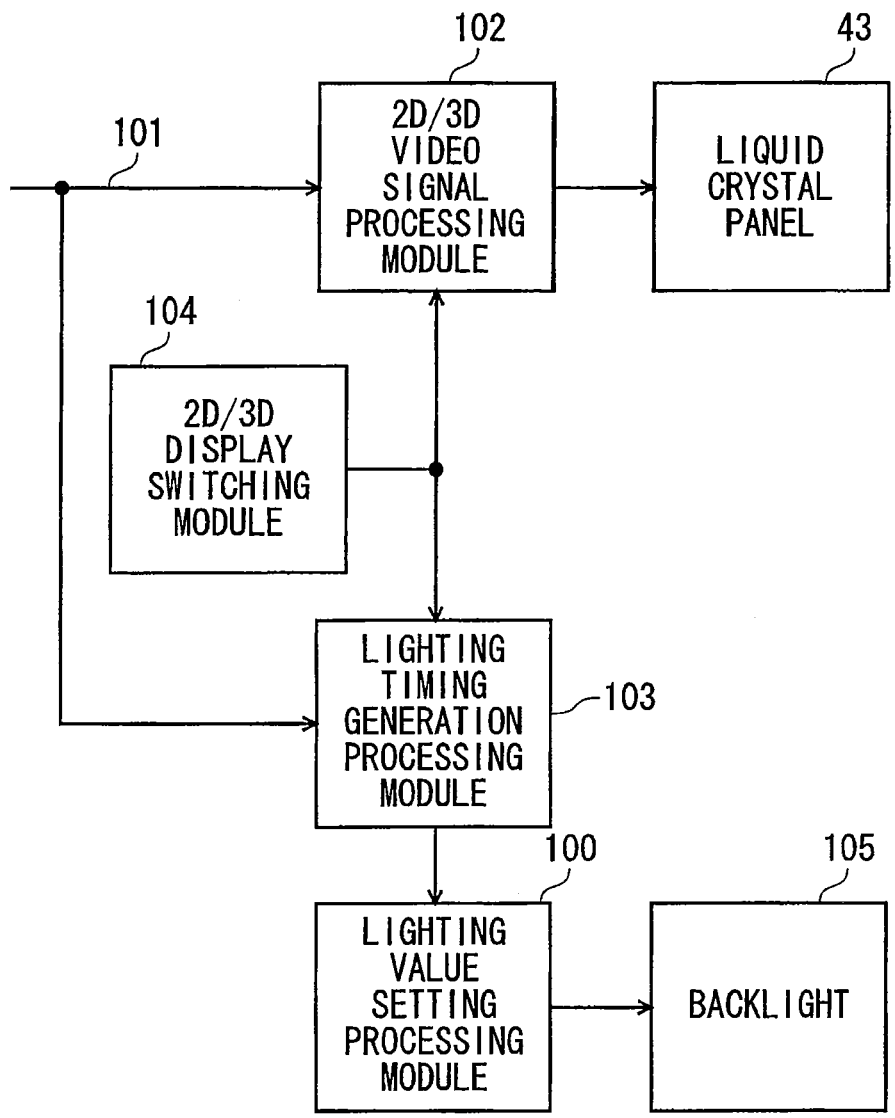
FIG. 4 is an exemplary functional block diagram showing the configuration of the liquid crystal display apparatus according to the first embodiment.

FIG. 4 is an exemplary functional block diagram showing the configuration of the liquid crystal display apparatus 1 according to the embodiment.

A video signal 101 is input to a 2D/3D video signal processing module 102 and a lighting timing generation processing module 103. The lighting timing generation processing module 103 generates timing information of backlight lighting start/lighting end based on a sync signal that is contained in the received video signal 101. Alternatively, the lighting timing generation processing module 103 may generate timing information including lighting start timing information and lighting period information (lighting value). The lighting timing generation processing module 103 supplies the generated timing information to a lighting value setting processing module 100. The lighting value setting processing module 100 generates a control signal for the backlight 105 according to the received timing information and outputs the generated control signal to the backlight 105. A user selection signal (not shown) is input to a 2D/3D display switching module 104 and is used for selecting 2D display or 3D display. Selection information that accompanies the video signal 101 may be used instead of the user selection signal. A display switching signal indicating a selection result is input to the 2D/3D video signal processing module 102 and the lighting timing generation processing module 103. If 3D display is selected, the 2D/3D video signal processing module 102 converts the received video signal 101 into a signal having a format that is suitable for 3D display such as a left-eye/right-eye image field-sequential video signal and outputs the signal to the liquid crystal panel 43. In doing so, the 2D/3D video signal processing module 102 inserts a black image between each pair of 3D left-eye and right-eye frames before output of the signal. If 2D display is selected, the 2D/3D video signal processing module 102 outputs the received video signal 101 as it is or, to output a signal that is higher in frame frequency than the video signal 101 to the liquid crystal panel 43 by generating insert images according to frame rate conversion processing. Black images may be inserted as insert images. The lighting timing generation processing module 103 changes the timing information depending on which of 2D display and 3D display is selected, based on the display switching signal.

FIGS. 5A and 5B are exemplary diagram showing video signals for 3D display and 2D display, respectively, used in the embodiment.

Assume that a video signal for 3D display shown in FIG. 5A is input in which a left-eye image and a right-eye image are mixed in each frame. Before being displayed on the liquid crystal panel 43, each frame is divided into a left-eye frame and a right-eye frame and black image is inserted. Therefore, even if the frame rate of the liquid crystal panel 43 is doubled (to 120 fps, for example), since each unit of 3D video (a left-eye frame and a right-eye frame (two frames)) consists of four frames, the actual frame rate is made a half of the frame rate of the input video signal.

FIG. 5B shows an input video signal for 2D display which has the same frame rate as the input video signal for 3D display shown in FIG. 5A. Where the frame rate of the liquid crystal panel 43 is doubled, the number of displayable frames is also doubled. The 2D/3D video signal processing module 102 performs the above-described signal processing so that images such as an insert image A1-B1 are inserted or black images (not shown) are inserted as in the case of 3D display.

To facilitate understanding, a panel-frame-rate-doubled video signal is shown in the bottom part of each of FIGS. 5A and 5B. The internal processing of the 2D/3D video signal processing module 102 may be any of original rate processing, double rate processing, and quadruple rate processing. However, it goes without saying that the frame rate of output video of the liquid crystal panel 43 should be equal to the actual one.

Next, the switching of the manner of generation of lighting timing information will be described. When switching is made between 2D display and 3D display, effective video frames of the input video signal itself are changed. To accommodate this change, naturally the backlight 105 operates with its lighting timing changed (details will not be described). A description will be made of backlight lighting timing for each of 2D display and 3D display in a case that black images are inserted as shown in FIG. 5A.

Figure 6A:
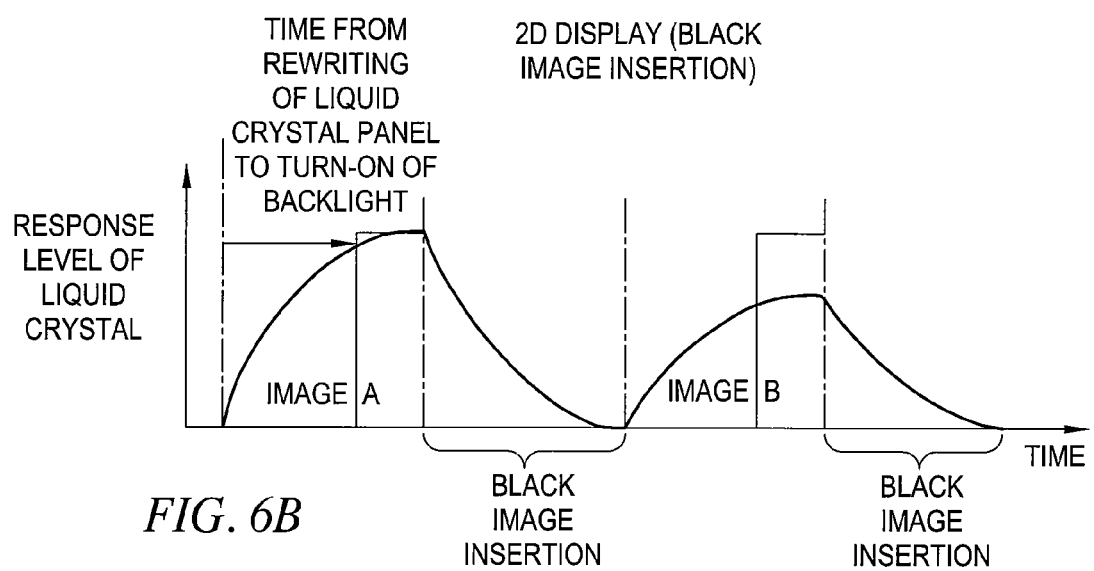
FIGS. 6A and 6B are exemplary diagrams showing a lighting timing of a backlight for 2D display in the first embodiment.
Figure 6B:
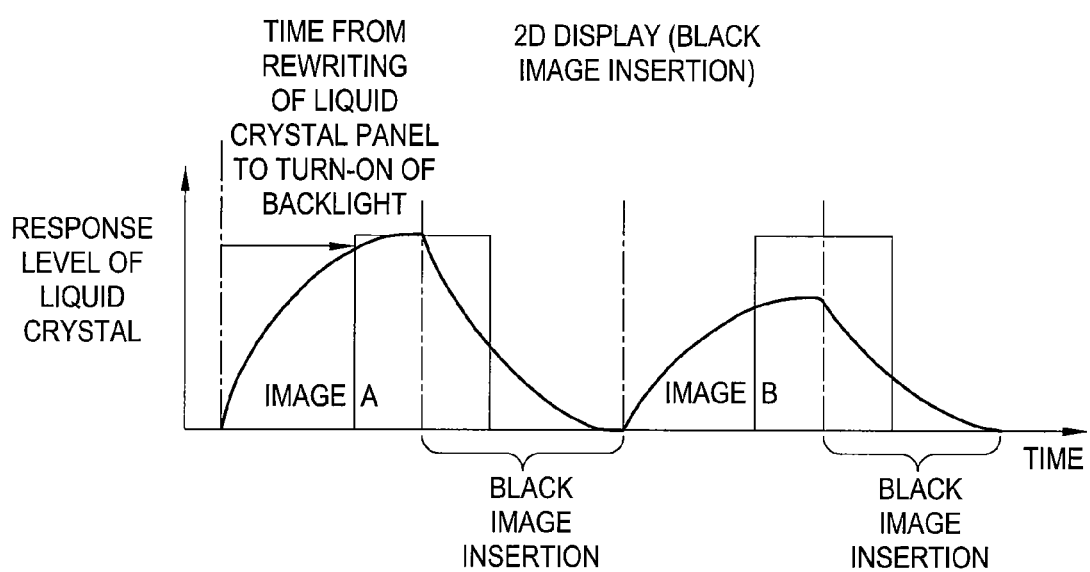

FIGS. 6A and 6B show examples in which 2D display is performed and the backlight 105 is lit with insertion of black images. In FIGS. 6A and 6B and the following figures, the horizontal axis represents time and the vertical axis represents the response level of the liquid crystal. Rectangles indicate periods when the backlight 105 is lit. Ordinary liquid crystal panels are low in response speed. It is therefore common knowledge that the backlight should be turned on after a lapse of a certain time from the start of rewriting of a liquid crystal panel, that is, the backlight should be lit during a late period of a response of the liquid crystal. As shown in FIG. 6A, the backlight 105 is controlled so as to light mainly during a period when the transmittance of the liquid crystal is high. However, where black images are inserted, as shown in FIG. 6B, the backlight 105 may be controlled so as to continue to light in the ensuing black image insertion period.

Figure 7A:
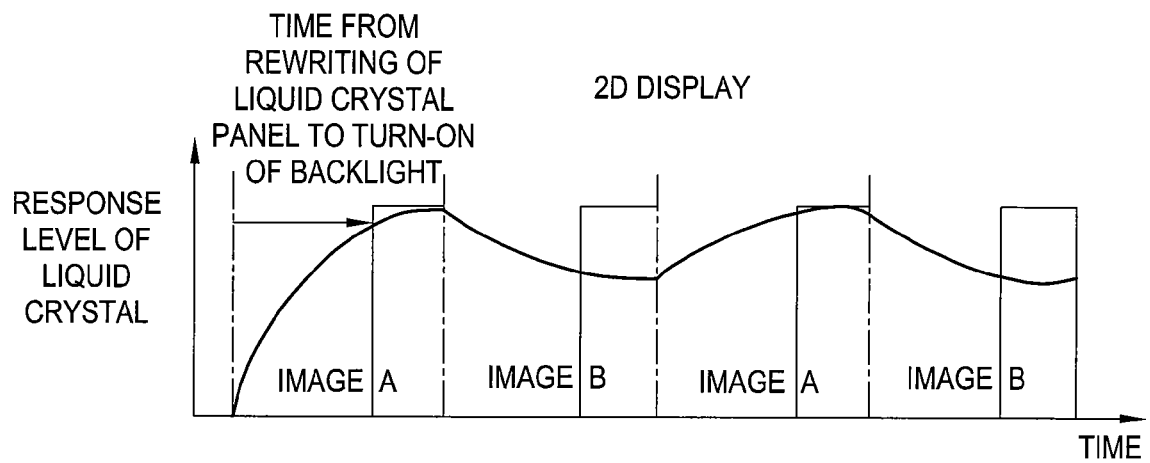
FIG. 7A is an exemplary diagram showing a lighting timing of the backlight for 2D display in the first embodiment.
Figure 7B:
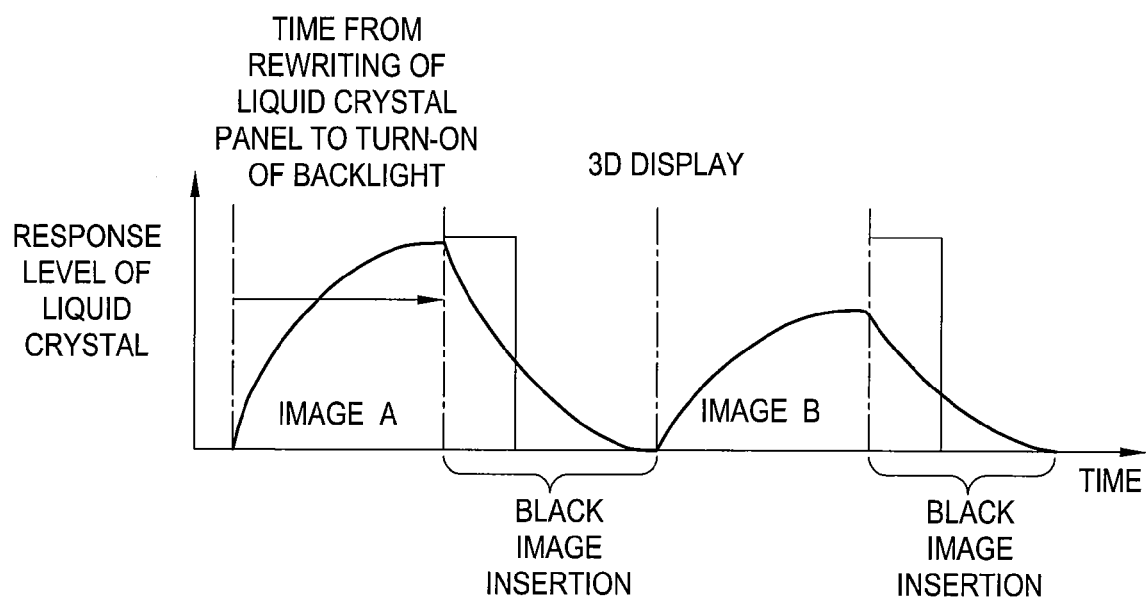
FIG. 7B is an exemplary diagram showing a lighting timing of the backlight for 3D display in the first embodiment.

FIG. 7A shows an example in which 2D display is performed and no black images are inserted into a video signal. In this case, the backlight 105 is controlled so as to be turned on a short time before writing of the next video data. In contrast, in the case of 3D display, as shown in FIG. 7B, the backlight 105 is turned on later than in the case of 2D display so as to light in the ensuing black image insertion period. The backlight 105 may be turned on in a video period. The time of the center of gravity of each rectangle in the 3D display (FIG. 7B) is later than that in the 2D display (FIG. 7A). This delay also applies to a case that the backlight 105 is lit according to a non-rectangular-wave signal or is not lit according to a single-rectangular-wave signal. This is because in the case of 3D display the important thing is to display a left-eye image and a right-eye image in such a manner that switching between them is made reliably. However, because of the slow response speed of the liquid crystal, influence of a preceding video signal level remains even if a black image is inserted. Setting the backlight turn-on timing of the 3D display later than that of the 2D display can reduce such influence and hence the degree of crosstalk between a left-eye image and a right-eye image.

(Embodiment 2)

A second embodiment will be described below with reference to FIGS. 1-9. Modules etc. having the same ones in the first embodiment will not be described in detail.

Figure 8:
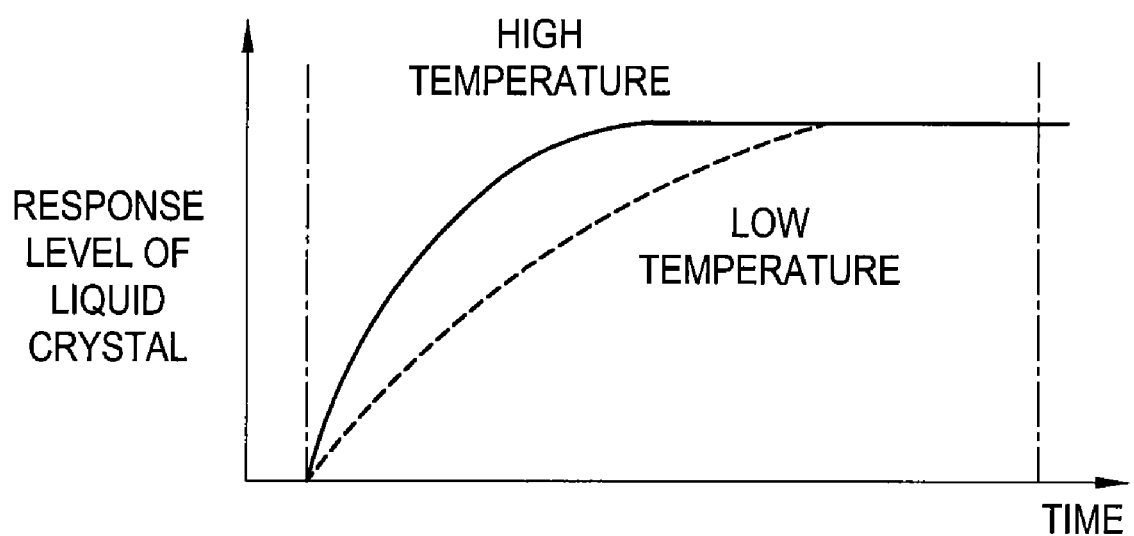
FIG. 8 is an exemplary diagram showing a temperature dependency of a response of a liquid crystal in the first embodiment.
Figure 9:
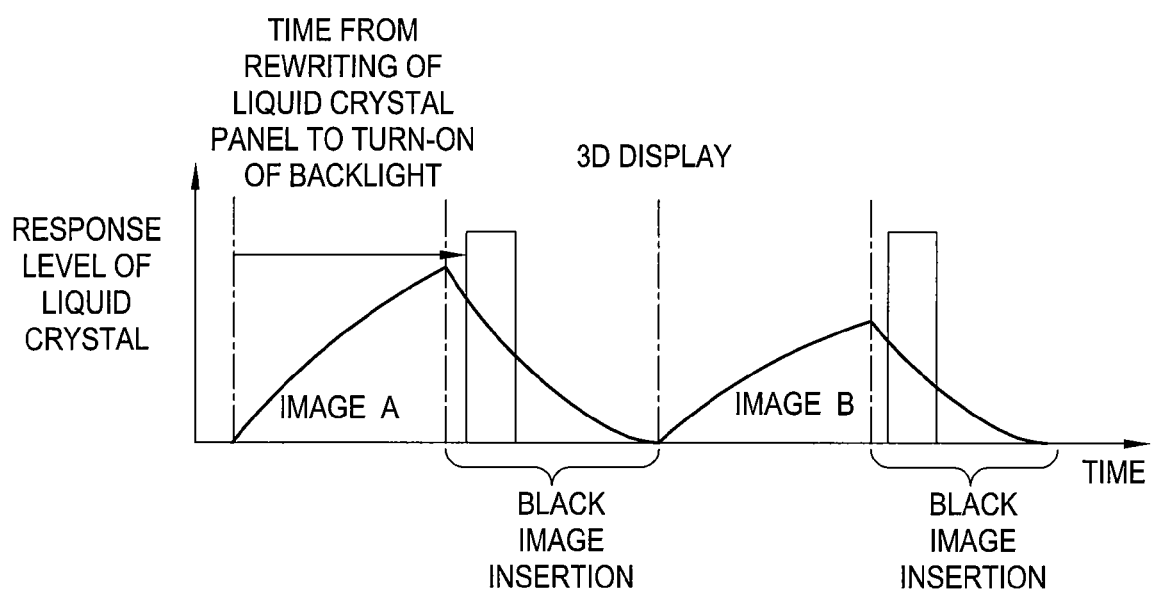
FIG. 9 is an exemplary diagram showing a lighting timing of a backlight for 3D display in a second embodiment.

It is known that the response speed of the liquid crystal is also affected by temperature, that is, as shown in FIG. 8 the response speed decreases as temperature becomes lower. In view of this, in this embodiment, a temperature sensor is incorporated in the lighting timing generation processing module 103 or temperature information is received from the outside. A control is performed so that as shown in FIG. 9 the turn-on timing is delayed further when the temperature is low. This measure can reduce the influence of the decrease in response speed. In the example of FIG. 9, the lighting period is made shorter according to the delay of the turn-on timing. This is to prevent a phenomenon that when the lighting period is unduly long, video of the next frame appears because of leak light between the lines of the backlight 105 and the crosstalk is increased contrary to the intention. As described above, also in this embodiment, the backlight turn-on timing with respect to the write timing for the liquid crystal panel 43 can be changed between the 2D display and the 3D display. This makes it possible to reduce the degree of crosstalk in the 3D display and thereby allows the user to enjoy more stereoscopic video.

In the above embodiments, the backlight turn-on timing with respect to the write timing for the liquid crystal panel 43 is changed between the 2D display and the 3D display. In the 3D display, the backlight 105 is turned on in a black image insertion period. If the response speed of the liquid crystal is unduly low, influence of the preceding frame remains even if a black image is inserted. Therefore, the backlight 105 is lit in a period that includes a black image insertion period. The degree of crosstalk in the 3D display can thus be reduced. Since the response speed of the liquid crystal is also affected by temperature, the turn-on timing is controlled also according to temperature. The embodiments are summarized as follows:

(1) A video display apparatus includes a backlight lighting module capable of controlling the lighting of a backlight independently at least at positions arranged in the direction that is perpendicular to a line direction; a signal processing module which accommodates 2D display and 3D display; and a lighting timing generation processing module which switches between a backlight lighting period for the 2D display and a backlight lighting period for the 3D display. Further, the video display apparatus includes a module which inserts black images; and a module which controls the backlight lighting period. The module controlling the backlight lighting period includes a module which changes the backlight lighting period in the 2D display and the 3D display.

(2) The signal processing module performs processing of inserting black images at least in the 3D display.

(3) The lighting timing generation processing module sets backlight turn-on timing for the 2D display so that the backlight lights in a period when transmittance of a liquid crystal panel is high and sets backlight turn-on timing for the 3D display later than the backlight turn-on timing for the 2D display so that the backlight lights in a period including a black image insertion period.

(4) The lighting timing generation processing module comprises an ambient temperature sensor and sets backlight turn-on timing for the 3D display later as the temperature measured by the ambient temperature sensor decreases.

(5) In item (4), the lighting timing generation processing module keeps backlight turn-off timing approximately constant by setting the backlight lighting period shorter as the temperature measured by the ambient temperature sensor decreases.

According to the embodiments, in a video display apparatus capable of ordinary 2D display and 3D display, the degree of crosstalk between a left-eye image and a right-eye image can be reduced in the 3D display, which allows the user to enjoy more stereoscopic video. In particular, where 3D display is performed by displaying a left-eye image and a right-eye image sequentially using a slow-response liquid crystal panel, the embodiment provide an advantage that the degree of crosstalk between a left-eye image and a right-eye image can be reduced while an enhanced stereoscopic effect is secured.

While certain embodiments have been described, these embodiments have been presented by way of example only, and are not intended to limit the scope of the invention. Indeed, the novel apparatus and method described herein may be embodied in a variety of other forms; furthermore, various omissions, substitutions and changes in the form of the apparatus and method described herein may be made without departing from the spirit of the invention. The accompanying claims and their equivalents are intended to cover such forms or modifications as would fall within the scope and spirit of the invention.

What is claimed is:

1. A video display apparatus comprising:

a backlight;

a signal processing module configured to process an input video signal and output an output video signal for 2D display and 3D display;

a transmission-type display panel configured to control transmission of light supplied from the backlight according to the output video signal; and a display switching module configured to switch between a backlight lighting period for the 2D display and a backlight lighting period for the 3D display, wherein the display switching module is configured for the 2D display to turn on the backlight during a current rewriting period for video to be displayed on the transmission-type display panel and then turn off the backlight at a time equal to or earlier than a start of a next rewriting period for video to be displayed on the transmission-type display panel and is configured for the 3D display to execute processing of inserting a black image every time the video to be displayed on the transmission-type display panel is rewritten and to turn on and off the backlight so that the center of the backlight lighting period for the 3D display is overlapped with an insertion period of the black image.

2. The apparatus of claim 1, wherein the signal processing module is configured to set the backlight lighting period for the 2D display so that a portion where transmittance of a liquid crystal panel is high is sufficiently included in the backlight lighting period, and to turn on the backlight so that the center of the backlight lighting period for the 3D display is overlapped with a display period of the black image.

3. The apparatus of claim 1, wherein the display switching module comprises an ambient temperature sensor, and when temperature measured by the ambient temperature sensor is low during selecting the 3D display, the display switching module is configured to start turn-on later than turn-on when temperature is high.

4. A video display method of a video display apparatus capable of controlling a backlight and a transmission-type display panel configured to control transmission of light supplied from the backlight, comprising:

processing an input video signal and outputting an output video signal for 2D display and 3D display;

switching between a backlight lighting period for the 2D display and a backlight lighting period for the 3D display;

for the 2D display, turning on the backlight during a current rewriting period for video to be displayed on the transmission-type display panel and then turning off the backlight at a time equal to or earlier than a start of a next rewriting period for video to be displayed on the transmission-type display panel; and for the 3D display, executing processing of inserting a black image every time the video to be displayed on the transmission-type display panel is rewritten and turning on and off the backlight so that the center of the backlight lighting period for the 3D display is overlapped with an insertion period of the black image.

5. The video display method of claim 4, further comprising:

for the 2D display, executing processing of inserting a black image every time the video to be displayed on the transmission transmission-type display panel is rewritten.

6. The video display method of claim 5, wherein the backlight is turned off at a time equal to a start of the black image insertion.

7. The video display method of claim 5, wherein the backlight is turned off at a time after a start of the black image insertion.

* * * * *